United States Patent
Corral-Soto

(10) Patent No.: US 8,818,045 B2
(45) Date of Patent: Aug. 26, 2014

(54) ADAPTIVE SUB-PIXEL ACCURACY SYSTEM FOR MOTION AND DISPARITIES ESTIMATION

(75) Inventor: Eduardo R. Corral-Soto, Toronto (CA)

(73) Assignee: STMicroelectronics (Canada), Inc., Ontario (CA)

( * ) Notice: Subject to any disclaimer, the term of this patent is extended or adjusted under 35 U.S.C. 154(b) by 140 days.

(21) Appl. No.: 13/340,287

(22) Filed: Dec. 29, 2011

(65) Prior Publication Data

US 2013/0169879 A1    Jul. 4, 2013

(51) Int. Cl.
*G06K 9/00*    (2006.01)
(52) U.S. Cl.
USPC .......................................... 382/107
(58) Field of Classification Search
None
See application file for complete search history.

(56) References Cited

U.S. PATENT DOCUMENTS

2009/0161763 A1*  6/2009  Rossignol et al. ....... 375/240.16

OTHER PUBLICATIONS

Zhang, Wei, Xiang Zhong Fang, and Xiaokang Yang. "Moving vehicles segmentation based on Bayesian framework for Gaussian motion model." Pattern Recognition Letters 27.9 (2006): 956-967.*
Hariharakrishnan, Karthik, and Dan Schonfeld. "Fast object tracking using adaptive block matching." Multimedia, IEEE Transactions on 7.5 (2005): 853-859.*
Choi, Min-Kook, Joonseok Park, and Sang-Chul Lee. "Event classification for vehicle navigation system by regional optical flow analysis." Machine Vision and Applications (2011): 1-13.*

* cited by examiner

*Primary Examiner* — Nirav G Patel

(57) ABSTRACT

Display 105 is capable of rendering, or otherwise displaying, one or more of a standard definition (SD) image, a two-dimensional (2D), a three-dimensional image (3D) and a high definition (HD) image 110.

20 Claims, 6 Drawing Sheets

ADAPTIVE SUB-PIXEL ACCURACY SYSTEM FOR MOTION AND DISPARITIES ESTIMATION

TECHNICAL FIELD

The present invention relates generally to image processing, and more particularly to system and method for motion estimation for slow moving structures.

BACKGROUND

A variety of image formats are known. For example, many image systems today utilize a high definition (HD) resolution image, a standard definition (SD) image and a three dimensional (3D) image. Motion & disparities estimation algorithms are used in several applications such as motion-compensated temporal interpolation, multiple-frame superresolution and 3D stereo processing where it is common practice to compute motion vectors that have a fractional component. These fractional vectors are typically produced by a "fixed" mechanism of some kind, such as by the introduction of a fixed set of fractional candidates.

SUMMARY

Other technical features may be readily apparent to one skilled in the art from the following figures, descriptions, and claims.

In a first embodiment, an image processing apparatus includes a memory configured to receive and store a video image frame. The video image frame includes a video image. The image processing apparatus also includes a motion estimator. The motion estimator is configured to: identify at least one object in the video image frame; and adaptively apply a refined motion estimation on slow-moving objects in the image without affecting the performance on scenes with fast and mixed motions. The motion estimator is configured to selectively update a set of candidate motion vectors.

In a second embodiment, an imaging system includes a memory configured to receive and store a video image frame, the video image frame comprising a video image. The imaging system also includes a display configured to display the video image frame. The image processing system further includes processing circuitry configured to render the video image frame on the display. The processing circuitry includes a motion estimator configured to: identify at least one object in the video image frame; and adaptively apply a refined motion estimation on slow-moving objects in the image without affecting the performance on scenes with fast and mixed motions. The motion estimator is configured to selectively update a set of candidate motion vectors.

In a third embodiment, a method for image rending includes receiving and storing a video image frame. The video image frame includes a video image. The method also includes identify at least one object in the video image frame. In addition, the method includes adaptively applying a refined motion estimation on slow-moving objects in the video image without affecting the performance on scenes with fast and mixed motions. The refined motion estimation includes selectively update a set of candidate motion vectors.

Before undertaking the DETAILED DESCRIPTION OF THE INVENTION below, it may be advantageous to set forth definitions of certain words and phrases used throughout this patent document. The term "packet" refers to any information-bearing communication signal, regardless of the format used for a particular communication signal. The terms "application," "program," and "routine" refer to one or more computer programs, sets of instructions, procedures, functions, objects, classes, instances, or related data adapted for implementation in a suitable computer language. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged imaging system.

Figure 1:
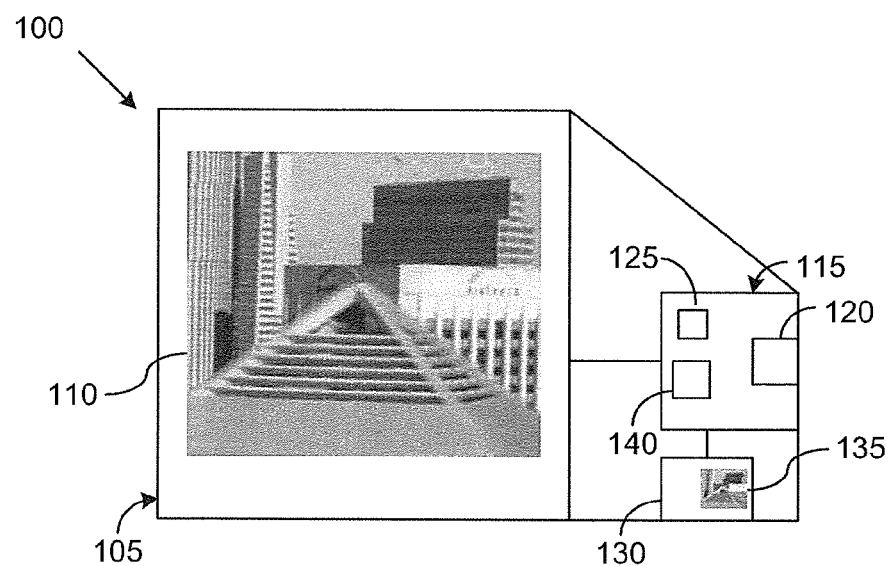
FIG. 1 illustrates an imaging system according to embodiments of the present disclosure.

FIG. 1 illustrates an imaging system according to embodiments of the present disclosure. The embodiment of the imaging system 100 shown in FIG. 1 is for illustration only. Other embodiments could be used without departing from the scope of this disclosure.

The imaging system 100 includes a display 105. Display 105 is capable of rendering, or otherwise displaying, one or more of a standard definition (SD) image, a two-dimensional (2D), a three-dimensional image (3D) and a high definition (HD) image 110, such as a high definition video. For example, display 105 includes components necessary to provide image resolutions of 1,280×720 pixels (720 p) or 1,920×1,080 pixels (1080 i/1080 p). The number of lines in the vertical display determine resolution. High-definition television (HDTV) resolution is 1,080 or 720 lines. The display 105 can include either a progressive scanning (p) or interlaced scanning (i) system.

The imaging system 100 also includes processing circuitry 115. The processing circuitry 105 can include a controller 120. As particular examples, the controller 120 may comprise a processor, a microprocessor, a microcontroller, a field programmable gate array, a digital signal processor (DSP), or any other processing or control device(s). The processing circuitry 115 can include a memory 125, which is coupled to the controller 120. The memory 125 stores any of a wide variety of information used, collected, or generated by the imaging system 100. For example, the memory 125 could store information transmitted over or received from a wired or wireless network, such as a satellite signal, cable signal, or internet signal. The memory 125 includes any suitable volatile and/or non-volatile storage and retrieval device(s). The processing circuitry 115 can process data, such as video imaging data, and cause the display 105 to render image 110 based on the data.

The imaging system 100 includes an interface 130. The interface 130 can receive video images 135, such as streaming video, for processing by the processing circuitry 115 and rendering by the display 105. In certain embodiments, the image 135 is generated via an external device, such as a digital video disc (DVD) player, coupled to the imaging system 100 via the interface 130. For example, the image 135 could be stored on a DVD. When inserted into the DVD player, the DVD player extracts the image 135 from the disc and transmits data related to the image 135 through the interface 130 for reconstruction and rendering by the imaging system 100. In certain embodiments, the image 135 is generated via an external signal, such as a satellite signal, coupled to the imaging system 100 via the interface 130.

In certain embodiments, the imaging system 100 also includes a video processing unit 140. The video processing unit 140 includes processing circuitry, which includes a motion estimator and a memory. The memory is configured to receive and store video information that includes a plurality of frames. The motion estimator is configured to perform motion and disparity estimation. For example, the video processing unit 140 adjusts a set of candidate "update" vectors dynamically in the motion estimator. Additionally, the video processing unit 140 can adaptively apply a refined motion estimation on slow-moving objects in the image without affecting the performance on scenes with fast and mixed (slow and fast) motions, which can produce enhanced results. Further, the video processing unit 140 is configured to sense a global motion to increase a refined search on slow-moving scenes and decrease the refined search on fast-moving scenes. That is, the video processing unit 140 is an adaptive mechanism configured to reduce artifacts (e.g., flicker) in slow-moving structures. The slow moving objects can include slow-moving structures (wherein the overall speed is low), sub-titles, slow-moving high-frequency structures (e.g., buildings), motion boundaries, slow rotations.

In certain embodiments, the video processing unit 140 is included in the processing circuitry 115. In certain embodiments, the video processing unit 140 is coupled to one or both of the processing circuitry 115 and memory 125. In certain embodiments, the video processing unit 140 is included in an external component, such as a DVD player, cable set-top box, or satellite set-top box.

Although FIG. 1 illustrates an example of an imaging system 100, various changes may be made to FIG. 1. For example, the imaging system 100 could include any number of its various components. Also, the functional divisions shown in FIG. 1 are for illustration only. Various components in FIG. 1 could be combined, subdivided, or omitted and additional components could be added according to particular needs.

Figure 2:
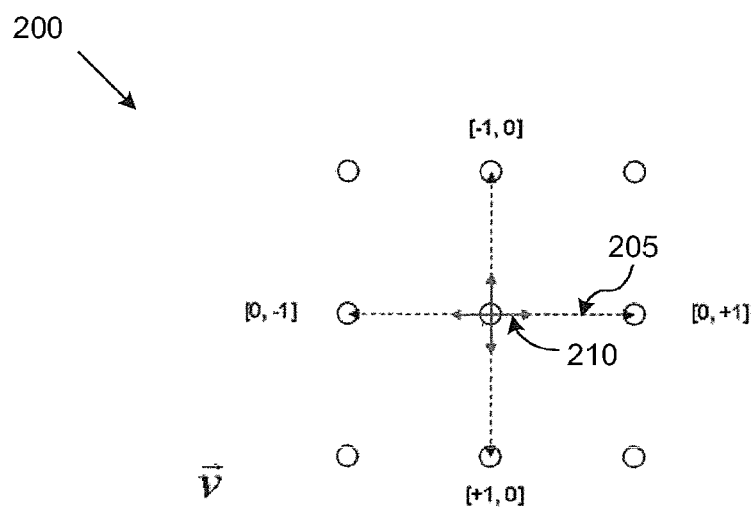
FIG. 2 illustrates a graph of integer and fractional updates according to embodiments of the present disclosure.

FIG. 2 illustrates a graph of integer and fractional updates according to embodiments of the present disclosure. The embodiment of the graph 200 shown in FIG. 2 is for illustration only. Other embodiments could be used without departing from the scope of this disclosure.

Motion estimators implemented in hardware for video processing chips have a fixed number of fractional bits. One way to allow the motion estimator in the video processing unit 140 to find fractional vectors is to add a set of fractional update candidate vectors to be evaluated. The vector $\vec{v}$ symbolizes a vector that is to be updated by means of adding one of the possible candidate update vectors from the set S={I, F}, where I={(0,1), (0,−1), (−1,0), (1,0)} denotes a sub-set of integer candidates 205 (the dashed arrows illustrated in FIG. 2), F={(0,α), (0,−α), (−α,0), (α,0)} denotes a sub-set of fractional candidates 210 (the solid arrows illustrated in FIG. 2), where α is a fractional scalar.

Figure 3:
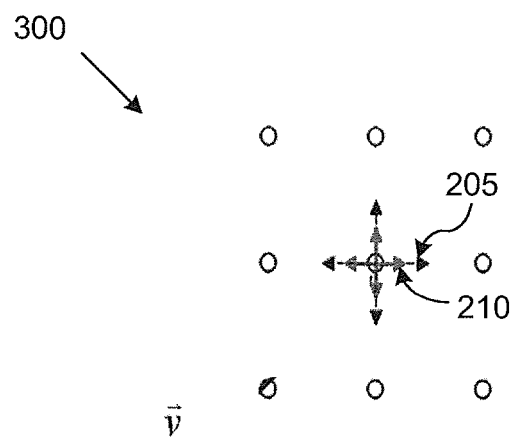
FIG. 3 illustrates modulation of the integer updates according to embodiments of the present disclosure.

FIG. 3 illustrates modulation of the integer updates according to embodiments of the present disclosure. The embodiment of the modulation of the integer updates 300 shown in FIG. 3 is for illustration only. Other embodiments could be used without departing from the scope of this disclosure.

When objects in the image 110 move very slowly, less weight is given to the evaluation of candidates from the set I and focus more on evaluating smaller updates, such as the ones from set F. In certain embodiments, when objects in the image 110 move very slowly, the video processing unit 140 modulates the magnitude of the candidates I 205. However, the video processing unit 140 does not modulate the candidates from set F 210.

The video processing unit 140 modulates an integer update vector $\vec{u}$ according to the following equation:

$$\rho_u^* = \frac{1}{\beta}\rho_u \qquad (1)$$

where, β is an integer scalar, which is a power of two.

Figure 4:
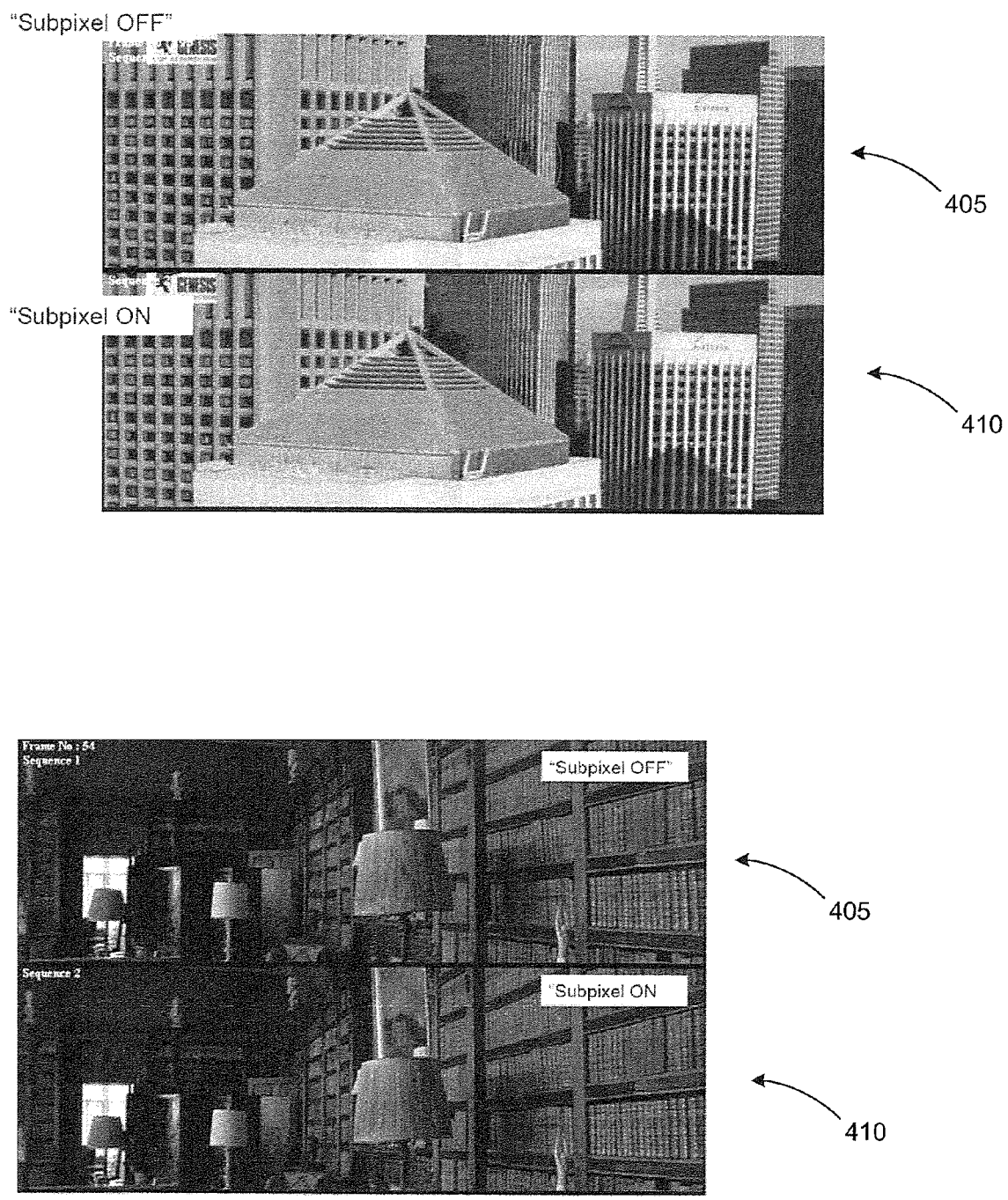
FIG. 4 illustrates motion-compensated temporally-interpolated images synthesized with a motion estimator setup to use only small updates according to embodiments of the present disclosure.

FIG. 4 illustrates motion-compensated temporally-interpolated images synthesized with a motion estimator setup to use only small updates according to embodiments of the present disclosure. The top portions 405 include Outputs with integer and fractional updates. The bottom portions 410 include Outputs with only fractional updates (as shown in FIG. 3).

If a motion estimator is setup to always focus on small updates, the motion estimation of slow-moving objects will improve, such as shown in FIG. 4. However, this slows down the vectors convergence on scenes with relatively fast moving objects, which can be a problem. Therefore, in certain embodiments, the video processing unit 140 is configured to perform a selective small update, which includes at least one of: a motion histogram analysis; and a frame-by-frame alternation.

In certain embodiments, the video processing unit 140 is configured to perform a motion histogram analysis. The video processing unit 140 builds a 2D histogram from the final motion vectors field for every inputted frame. Then, the video processing unit 140 identifies the K most significant (where significant means that the mode of a cluster is above a specified threshold T) clusters are identified in the histogram in order to extract their respective locations $\vec{o}$ (within the histogram). The video processing unit 140 uses this information to modulate β as follows:

$$\beta = \begin{cases} 1 & \|\vec{\rho}_{o_i}\| < T \quad \forall i \in \{1, 2, \ldots, K\} \\ \beta & \text{otherwise} \end{cases} \quad (2)$$

Figure 5:
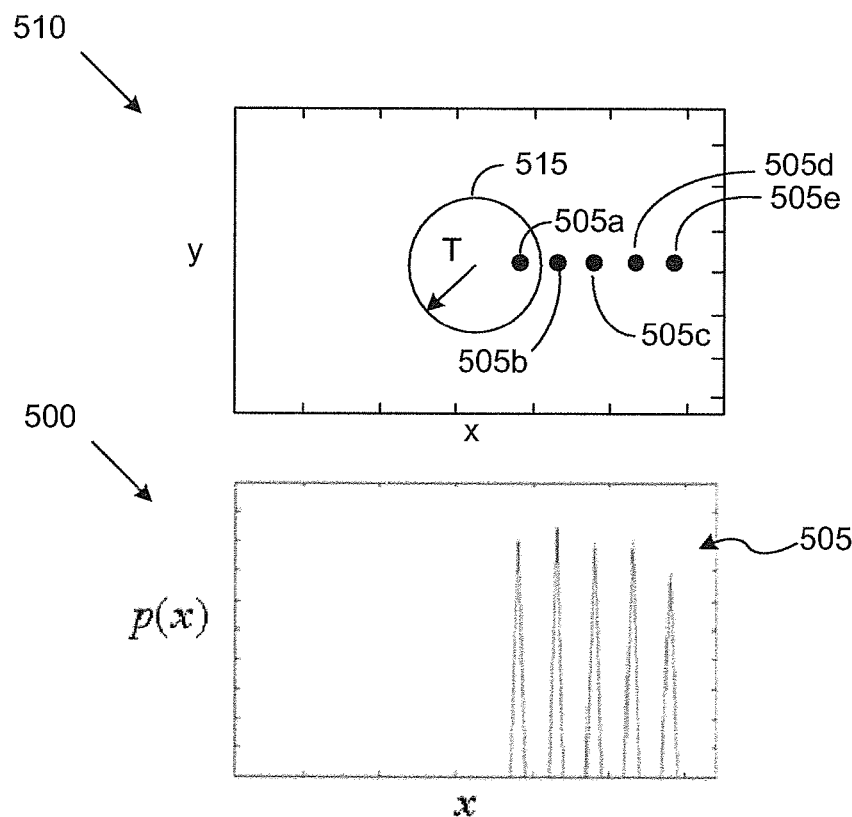
FIG. 5 illustrates a 2D histogram according to embodiments of the present disclosure.

FIG. 5 illustrates a 2D histogram according to embodiments of the present disclosure. The embodiment of the 2D histogram 500 shown in FIG. 5 is for illustration only. Other embodiments could be used without departing from the scope of this disclosure.

The 2D histogram 500 which has five well-defined clusters 505a through 505e. The five well-defined clusters 505a through 505e represent five objects moving in the frame at different speeds, which can be multiples of each other. For example, each of the clusters can correspond to an object vector $\vec{o}_i$. The clusters are represented in a chart 510, which also shows the threshold 515, for clarity. In addition, threshold T 515 is illustrated as a circle for clarity. In the example shown in FIG. 5, only one of the clusters 505a satisfies $\|\vec{o}_i\|$. Therefore, β=β in equation 2 since all of the clusters 505 are not less than the threshold. Accordingly, the video processing unit 140 does not modulate the magnitude of the candidates I 205 for this frame. Alternatively, if all of the clusters were less than the threshold T 510, then β=1 in equation 2 and the video processing unit 140 modulates the magnitude of the candidates I 205 for the corresponding frame. In each case, the video processing unit 140 does not modulate the candidates from set F 210.

Figure 6:
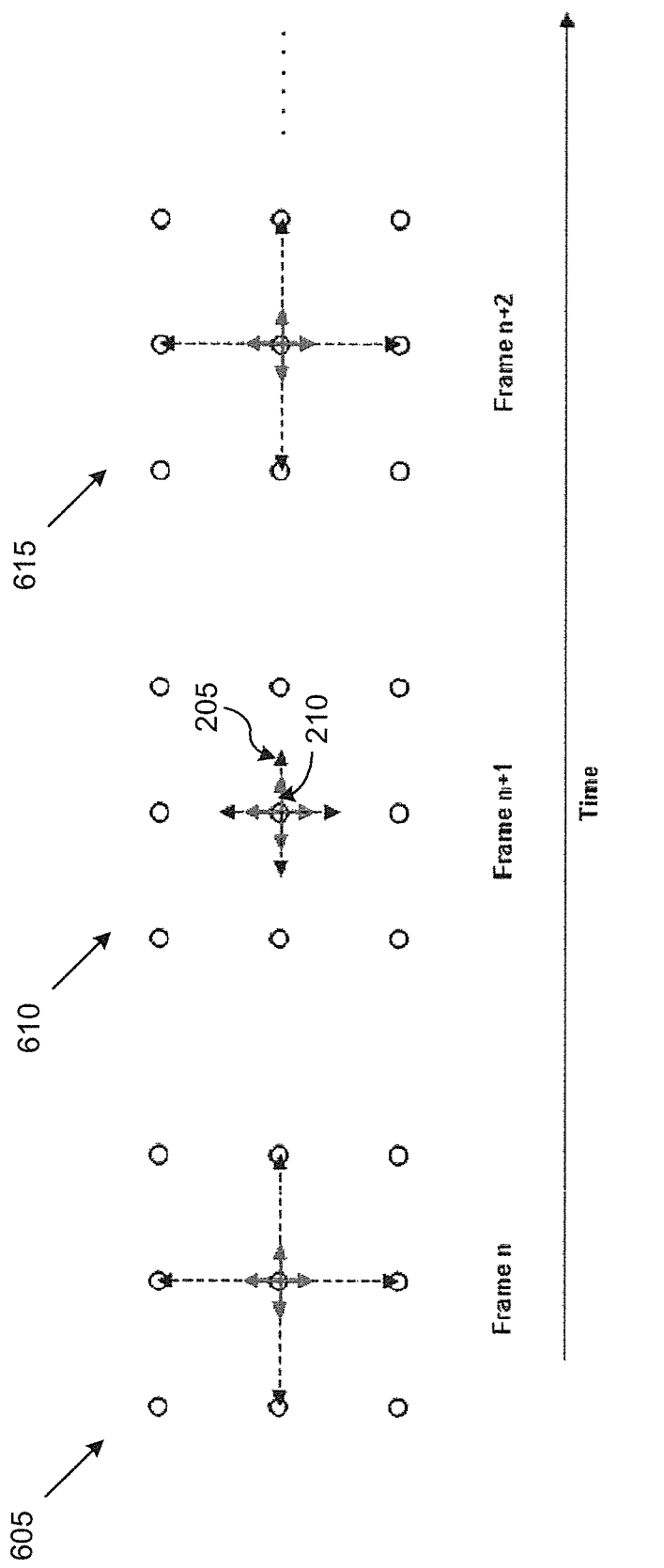
FIG. 6 illustrates a frame-by-frame alternation process according to embodiments of the present disclosure.

FIG. 6 illustrates a frame-by-frame alternation process according to embodiments of the present disclosure. The embodiment of the frame-by-frame alternation process 600 shown in FIG. 6 is for illustration only. Other embodiments could be used without departing from the scope of this disclosure.

In certain embodiments, the video processing unit 140 utilizes a frame-by-frame alternation process in order ensure convergence on fast-motion scenes. In the frame-by-frame alternation process, the video processing unit 140 modulates β at every other frame regardless of the information provided by the 2D histogram.

For example, in frame n 605, no modulation occurs. In frame n+1 610, the video processing unit 140 modulates β. That is, the video processing unit 140 modulates the magnitude of the candidates I 205 but does not modulate the candidates from set F 210. Thereafter, in frame n+2 615, no modulation occurs. In the examples shown in FIG. 6, although only three frames are illustrated for clarity, the modulation occurs in every other frame.

Figure 7:
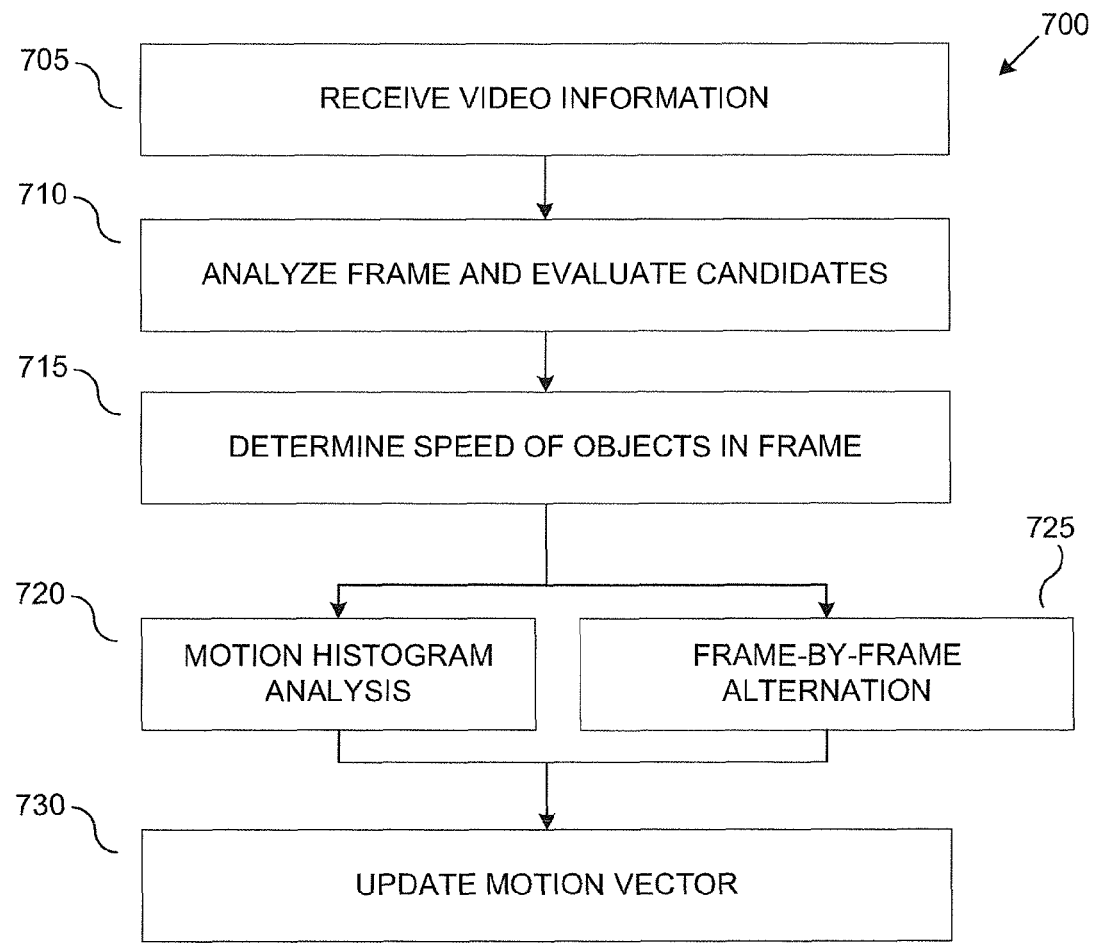
FIG. 7 illustrates a motion estimation process according to embodiments of the present disclosure.

FIG. 7 illustrates a motion estimation process according to embodiments of the present disclosure. The embodiment of the motion estimation process 700 shown in FIG. 7 is for illustration only. Other embodiments could be used without departing from the scope of this disclosure.

In block 705, the video processing unit 140 receives a frame of a video image. The video processing unit 140 evaluates integer and fractional candidate vectors in block 710. The candidate vectors are selected from the set S={I, F}, where I={(0,1), (0,−1), (−1,0), (1,0)} denotes a sub-set of integer candidates 205, F={(0,α), (0,−α), (−α,0), (α,0)} denotes a sub-set of fractional candidates 210, where α is a fractional scalar. In block 715, the speed of objects in the frame is determined. Thereafter, a selective small update is calculated using at least one of a motion histogram analysis in block 720; and a frame-by-frame alternation in block 725. The video processing unit 140 performs a vector update in block 730.

Figure 8:
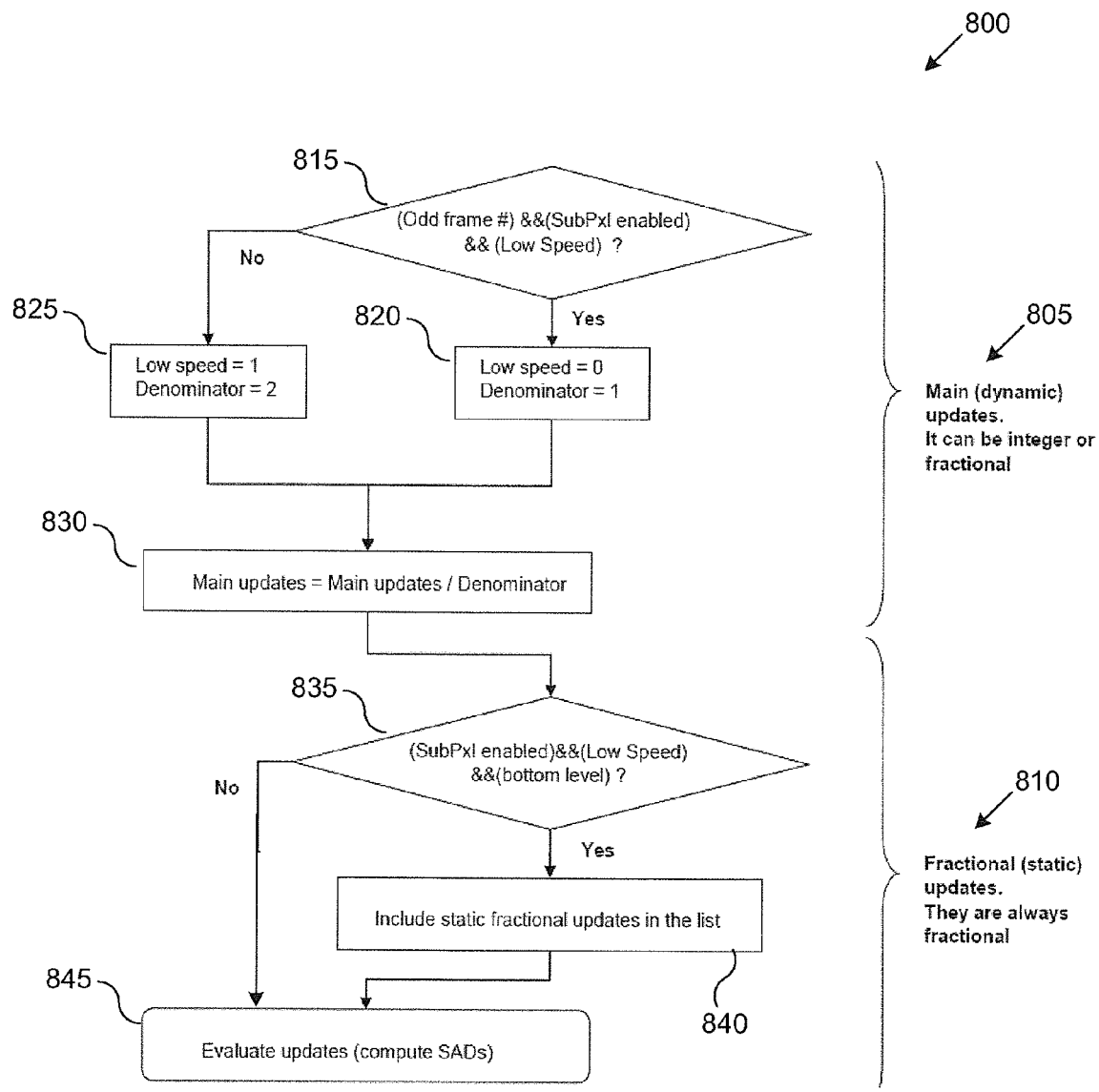
FIG. 8 illustrates a frame-by-frame motion estimation process according to embodiments of the present disclosure.

FIG. 8 illustrates a frame-by-frame motion estimation process according to embodiments of the present disclosure. The embodiment of the frame-by-frame motion estimation process 800 shown in FIG. 8 is for illustration only. Other embodiments could be used without departing from the scope of this disclosure.

The motion estimation process includes a series of steps for dynamic updates 805 and a series of steps for static updates 810. The dynamic updates 805 can be an integer or fractional. The static updates 810 are always fractional.

In block 815, the video processing unit 140 determines whether the frame is an odd number, has a sub-pixel enabled and is at a low speed. That is, the video processing unit 140 determines the frame number such that analysis is performed on every other frame, such as the every odd frame. However, in certain embodiments, analysis is performed on every even frame. The video processing unit 140 also determines whether objects in the frame are moving slowly, or near zero.

If the video processing unit 140 determines that the frame is an odd number, a sub-pixel enabled and the frame is at a low speed, in block 820 the video processing unit 140 sets a low speed flag to "0" to reflect near zero movement and a Denominator to "1". Alternatively, in block 825, the video processing unit 140 sets a low speed flag to "1" and the Denominator to "2".

Thereafter, the video processing unit 140 computes the main (e.g., dynamic) updates in block 830. The main updates are calculated according to:

$$\text{main updates} = \frac{\text{main updates}}{\text{Denominator}} \quad (3)$$

The main updates are calculated to determine a modulation to be applied to one of the candidates. That is, if the Denominator is set to "1", the main updates=1 and no modulation is performed, such as on the magnitude of the candidates I 205. However, if the Denominator is set to "2", modulation is performed on the magnitude of the candidates I 205.

Thereafter, the video processing unit 140 computes the static updates 810. In block 835, the video processing unit 140 verifies that the sub-pixel is enabled, the frame is at a low speed, and selects a bottom level of a resolution pyramid to refine. The video processing unit 140 uses the bottom level of the resolution pyramid, therefore, refinement is performed on the original resolution image, not on a smaller resolution image. If the video processing unit 140 determines that the sub-pixel is enabled, the frame is at a low speed, and that the bottom level is selected, in block 840 the video processing unit 140 includes static fractional updates in the list. After including the static fraction updates in block 840, or if the video processing unit 140 determines that one of more of the sub-pixel is not enabled, the frame is not at a low speed, the video processing unit evaluates the updates in block 845. In block 845, the video processing unit performs an error measurement, such as a Sum of Absolute Difference (SAD).

The video processing unit 140 is configured to perform the aforementioned adaptive refinement process, including the modulation of β via histogram analysis and alternation, on a very large set of long image sequences, including natural sequences with very small displacements, large displacements, mixture of small and large displacements, high-frequencies, global and local motion. The adaptive refinement process provides clear improvements, without affecting the performance on scenes with fast and mixed (slow and fast) motions, in the following:

1. —Slow-moving structures (where the overall speed is low);
2. —Sub-titles;
3. —Slow-moving high-frequency structures (e.g., buildings);
4. —Motion boundaries; and
5. —Slow rotations.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An image processing apparatus, comprising:
a memory configured to receive and store a video image frame, the video image frame comprising a video image; and
a motion estimator configured to:
identify at least one object in the video image frame, and
adaptively apply a refined motion estimation on slow-moving objects in the video image without affecting vector convergence on scenes with fast motions by selectively modulating magnitudes of a set of candidate motion vectors in alternate frames.

2. The apparatus of claim 1, wherein the refined motion estimation comprises a motion histogram analysis.

3. An imaging system, comprising:
a memory configured to receive and store a video image frame, the video image frame comprising a video image;
a display configured to display the video image frame; and
processing circuitry configured to render the video image frame on the display, the processing circuitry comprising:
a motion estimator configured to:
identify at least one object in the video image frame; and
adaptively apply a refined motion estimation on slow-moving objects in the video image without affecting vector convergence on scenes with fast motions by selectively modulating magnitudes of a set of candidate motion vectors in alternate frames.

4. The imaging system of claim 3, wherein the refined motion estimation comprises a motion histogram analysis.

5. A method for image rendering, the method comprising:
receiving and storing a video image frame, the video image frame comprising a video image;
identifying at least one object in the video image frame; and
adaptively applying a refined motion estimation on slow-moving objects in the video image without affecting vector convergence on scenes with fast motions by selectively modulating magnitudes of a set of candidate motion vectors in alternate frames.

6. The method of claim 5, wherein the refined motion estimation comprises a motion histogram analysis.

7. An image processing apparatus, comprising:
a memory configured to receive and store a video image frame, the video image frame comprising a video image; and
a motion estimator configured to:
identify at least one object in the video image frame, and
adaptively apply a refined motion estimation on slow-moving objects in the video image without affecting the performance on scenes with fast and mixed motions,
wherein the motion estimator is configured to selectively update a set of candidate motion vectors,
wherein the refined motion estimation comprises a motion histogram analysis, and
wherein the motion histogram analysis comprises:
building a two-dimensional histogram;
identifying clusters in the two-dimensional histogram, wherein the clusters correspond to a plurality of objects in the video image frame; and
determining whether a norm each of the clusters is above a threshold.

8. The apparatus of claim 7, wherein the motion histogram analysis comprises modulating the video image frame when the mod of all clusters is below the threshold.

9. The apparatus of claim 7, wherein the refined motion estimation comprises a frame-by-frame alternation.

10. An imaging system, comprising:
a memory configured to receive and store a video image frame, the video image frame comprising a video image;
a display configured to display the video image frame; and
processing circuitry configured to render the video image frame on the display, the processing circuitry comprising:
a motion estimator configured to:
identify at least one object in the video image frame, and
adaptively apply a refined motion estimation on slow-moving objects in the video image without affecting the performance on scenes with fast and mixed motions, wherein the motion estimator is configured to selectively update a set of candidate motion vectors, wherein the refined motion estimation comprises a motion histogram analysis,
wherein the motion histogram analysis comprises:
building a two-dimensional histogram,
identifying clusters in the two-dimensional histogram, wherein the clusters correspond to a plurality of objects in the video image frame, and
determining whether a norm each of the clusters is above a threshold.

11. The imaging system of claim 10, wherein the motion histogram analysis comprises modulating the video image frame when the mod of all clusters is below the threshold.

12. The imaging system of claim 10, wherein the refined motion estimation comprises a frame-by-frame alternation.

13. A method for image rendering, comprising:
receiving and storing a video image frame, the video image frame comprising a video image;

identifying at least one object in the video image frame; and adaptively applying a refined motion estimation on slow-moving objects in the video image without affecting the performance on scenes with fast and mixed motions, wherein the refined motion estimation comprises selectively updating a set of candidate motion vectors, wherein the refined motion estimation comprises a motion histogram analysis, and wherein the motion histogram analysis comprises:
building a two-dimensional histogram,
identifying clusters in the two-dimensional histogram, wherein the clusters correspond to a plurality of objects in the video image frame,
determining whether a mode each of the clusters is above a threshold, and
modulating the vector updates when the norm of all clusters is below the threshold.

14. The method of claim 13, wherein the refined motion estimation comprises a frame-by-frame alternation.

15. An image processing apparatus, comprising:
a memory configured to receive and store a video image frame, the video image frame comprising a video image; and
a motion estimator configured to:
identify at least one object in the video image frame, and
adaptively apply a refined motion estimation on slow-moving objects in the video image without affecting the performance on scenes with fast and mixed motions,
wherein the motion estimator is configured to selectively update a set of candidate motion vectors,
wherein the refined motion estimation comprises a motion histogram analysis,
wherein the refined motion estimation comprises a frame-by-frame alternation, and
wherein the frame-by-frame alternation comprises a dynamic update process and a static update process.

16. An imaging system, comprising:
a memory configured to receive and store a video image frame, the video image frame comprising a video image;
a display configured to display the video image frame; and
processing circuitry configured to render the video image frame on the display, the processing circuitry comprising:
a motion estimator configured to:
identify at least one object in the video image frame, and
adaptively apply a refined motion estimation on slow-moving objects in the video image without affecting the performance on scenes with fast and mixed motions, wherein the motion estimator is configured to selectively update a set of candidate motion vectors, wherein the refined motion estimation comprises a motion histogram analysis,
wherein the refined motion estimation comprises a frame-by-frame alternation, and
wherein the frame-by-frame alternation comprises a dynamic update process and a static update process.

17. A method for image rendering, comprising:
receiving and storing a video image frame, the video image frame comprising a video image;
identifying at least one object in the video image frame; and
adaptively applying a refined motion estimation on slow-moving objects in the video image without affecting the performance on scenes with fast and mixed motions,
wherein the refined motion estimation comprises selectively updating a set of candidate motion vectors,
wherein the refined motion estimation comprises a motion histogram analysis,
wherein the refined motion estimation comprises a frame-by-frame alternation, and
wherein the frame-by-frame alternation comprises a dynamic update process and a static update process.

18. An image processing apparatus, comprising:
a memory configured to receive and store a video image frame, the video image frame comprising a video image; and
a motion estimator configured to:
identify at least one object in the video image frame, and
adaptively apply a refined motion estimation on slow-moving objects in the video image without affecting the performance on scenes with fast and mixed motions,
wherein the motion estimator is configured to selectively update a set of candidate motion vectors,
wherein the refined motion estimation comprises a motion histogram analysis,
wherein the refined motion estimation comprises a frame-by-frame alternation, and
wherein the frame-by-frame alternation comprises modulating every other frame based on a speed of the objects in the video image frame and according to:

$$\text{main updates} = \frac{\text{main updates}}{\text{Denominator}},$$

wherein the denominator is determined according to the results from the motion histogram analysis.

19. An imaging system, comprising:
a memory configured to receive and store a video image frame, the video image frame comprising a video image;
a display configured to display the video image frame; and
processing circuitry configured to render the video image frame on the display, the processing circuitry comprising:
a motion estimator configured to:
identify at least one object in the video image frame, and
adaptively apply a refined motion estimation on slow-moving objects in the video image without affecting the performance on scenes with fast and mixed motions, wherein the motion estimator is configured to selectively update a set of candidate motion vectors, wherein the refined motion estimation comprises a motion histogram analysis,
wherein the refined motion estimation comprises a frame-by-frame alternation, and
wherein the frame-by-frame alternation comprises modulating every other frame based on a speed of the objects in the video image frame and according to:

$$\text{main updates} = \frac{\text{main updates}}{\text{Denominator}},$$

wherein the denominator is determined according to the results from the motion histogram analysis.

20. A method for image rendering, comprising:
receiving and storing a video image frame, the video image frame comprising a video image;

identifying at least one object in the video image frame; and adaptively applying a refined motion estimation on slow-moving objects in the video image without affecting the performance on scenes with fast and mixed motions, wherein the refined motion estimation comprises selectively updating a set of candidate motion vectors, wherein the refined motion estimation comprises a motion histogram analysis, wherein the refined motion estimation comprises a frame-by-frame alternation, and wherein the frame-by-frame alternation comprises modulating every other frame based on a speed of the objects in the video image frame and according to:

$$\text{main updates} = \frac{\text{main updates}}{\text{Denominator}},$$

wherein the denominator is determined according to the results from the motion histogram analysis.

* * * * *